April 18, 1933.  H. SCHUTZ  1,904,088
FRAME PROVIDED WITH EASEL STAND
Filed Feb. 4, 1932   3 Sheets-Sheet 1

INVENTOR
HENRI SCHUTZ
BY Haseltine, Lake & Co.,
ATTORNEYS

April 18, 1933.  H. SCHUTZ  1,904,088
FRAME PROVIDED WITH EASEL STAND
Filed Feb. 4, 1932   3 Sheets-Sheet 2

INVENTOR
HENRI SCHUTZ
BY Haseltine, Lake & Co.,
ATTORNEYS

April 18, 1933.   H. SCHUTZ   1,904,088
FRAME PROVIDED WITH EASEL STAND
Filed Feb. 4, 1932   3 Sheets-Sheet 3
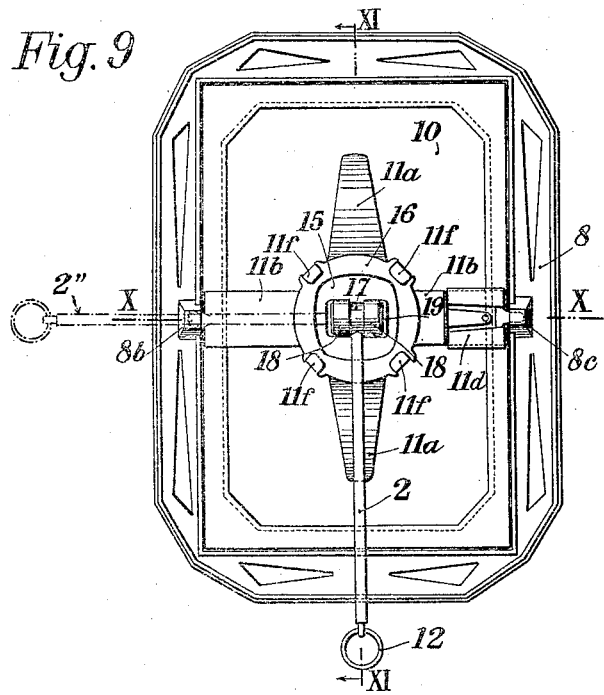
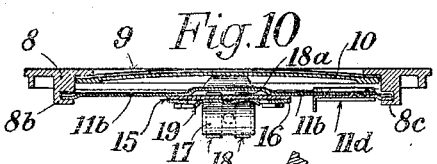
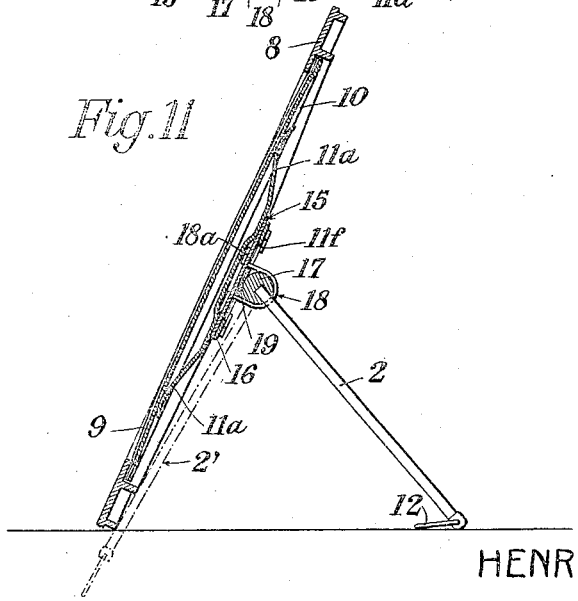
INVENTOR
HENRI SCHUTZ
BY Haseltine Lake & Co.,
ATTORNEYS Patented Apr. 18, 1933

1,904,088

UNITED STATES PATENT OFFICE

HENRI SCHUTZ, OF PARIS, FRANCE

FRAME PROVIDED WITH EASEL-STAND

Application filed February 4, 1932, Serial No. 590,876, and in France July 17, 1931.

This invention has for object improvements in frames, small plates, or other similar supporting elements used for supporting pictures, photographs, mirrors, or any other like articles, these supports being provided with a rear easel-stand which serves to maintain them in an inclined position.

These improvements are adapted to allow of giving to these easelstands any inclination relative to the supporting elements they sustain, according to the orientation or setting it is desired to give to these elements and to the surface on which they are placed, and for automatically taking up the play occurring in the joint of the stands owing to wear.

According to a preferred form of construction of the subject-matter of the invention, the easelstand is pivoted on the support to which it is secured by means of a spherical or cylindrical member attached to the upper end of the stand and arranged in a cup or in bearings provided on the back of the frame, small plate or other support, so that the stand may not only pivot about an axis parallel to the frame, etc., but also about an axis at right angles to this frame, for instance in the same way as a ball or Cardan joint.

Preferably, a resilient blade, suitably shaped and arranged, cambered either before assemblage, or upon assemblage by means of claws or rivets serving to secure it, constantly presses against the said pivoting member; the easel-stand is thus held stationary in any position by this resilient pressure, thus allowing the frame to be set in any position; moreover, owing to this resilient blade, the play due to wear of the friction surfaces is constantly and automatically taken up.

Other features of the invention, particularly relating to an arrangement allowing to fold the easel-stand against the frame to hang the latter on a wall, as well as an arrangement applicable to heavy or large sized articles, will be hereinafter described.

The accompanying drawings illustrate, by way of example only, various preferred forms of carrying out the subject-matter of the invention.

Figs. 1 and 2, relating to a first form of construction, are respectively a rear elevation, and a section made according to line II—II of Fig. 1.

Fig. 3 is a rear elevation thereof.

Figs. 4 and 5 are two sections thereof, made respectively according to lines IV—IV and V—V of Fig. 3.

Figure 6:
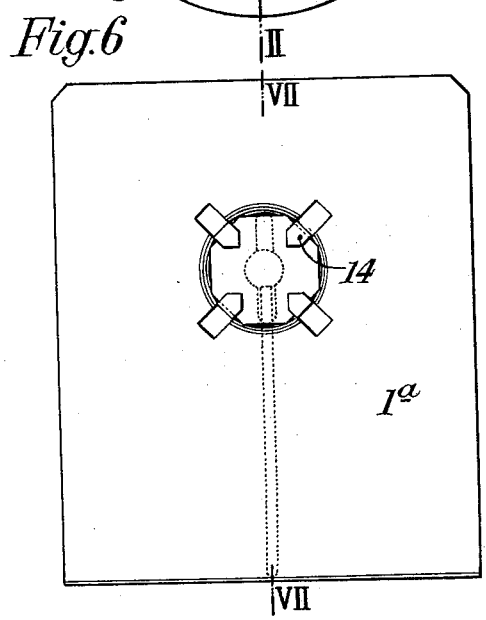
Figure 7:
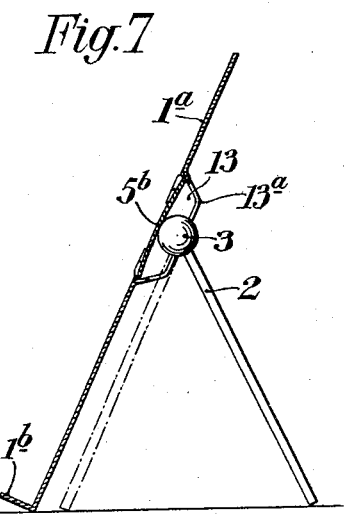

Figs. 6, 7 relating to a third form of construction, are respectively a front elevation and a section made according to line VII—VII of Fig. 6.

Figure 8:
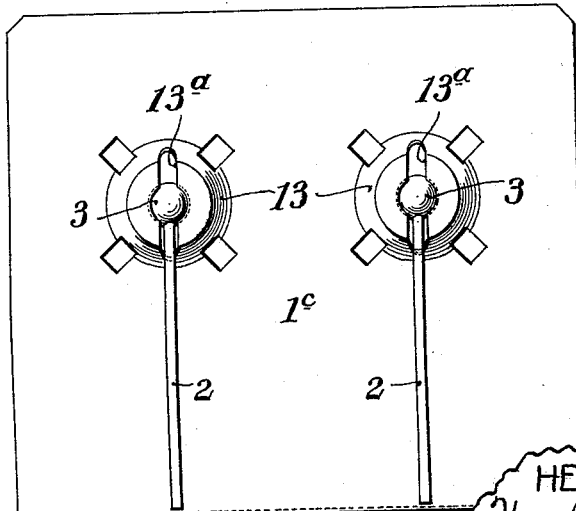

Fig. 8 is a rear elevation of a modification of the above form of construction.

Fig. 9 is a rear elevation of another modification.

Figs. 10 and 11 are sections made respectively according to lines X—X and XI—XI of Fig. 9.

Figure 1:
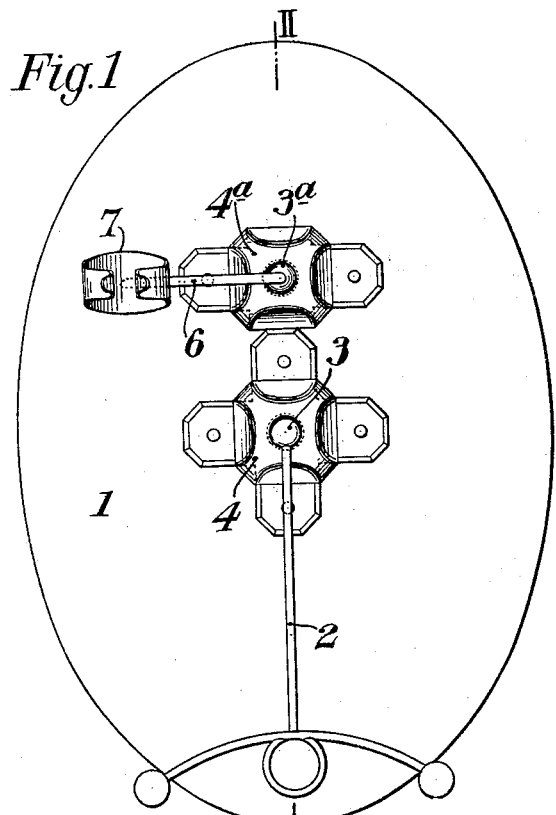
Figure 2:
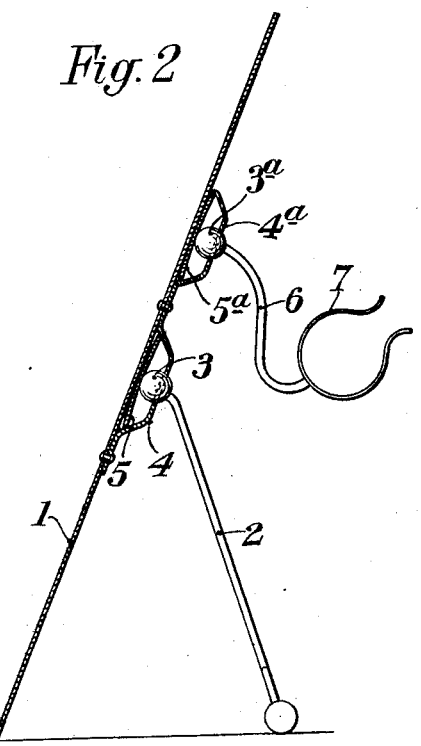

The device illustrated in Figs. 1 and 2, comprises a small plate 1, adapted for instance to carry a mirror, and supported by an orientatable easel-stand 2 mounted on its rear face.

The stand 2 is pivoted to the small plate 1 by means of spherical member 3, secured at one end of the stand 2 and arranged in a cup 4 constituted by a metal sheet suitably cut out and pressed, and riveted to the plate 1. The bottom of the cup 4 is perforated with an orifice through which the spherical member 3 projects, so that the stand 2 can pivot relatively to the plate 1.

This easel-stand is held stationary in any position by the action of a spring blade 5 interposed between the plate 1 and the spherical member 3, upon assemblage, and suitably curved to press the latter against the edge of the orifice provided in the cup 4, so as to cause this spherical member to rub against this edge; as previously stated, this blade 5 constitutes at the same time a device for taking up the play, thus automatically compensating the wear of the spherical member and of the bottom of the cup.

The rear face of the plate 1 carries a second arm 6, similarly mounted by means of a ball joint $3a$ arranged in a cup $4a$ and provided with a clamping blade $5a$.

This arm terminates in a resilient clamping collar 7, adapted for instance to receive a lamp, when the mirror is used for shaving; it is moreover suitably curved so that the said lamp may be set in any suitable position.

Figure 3:
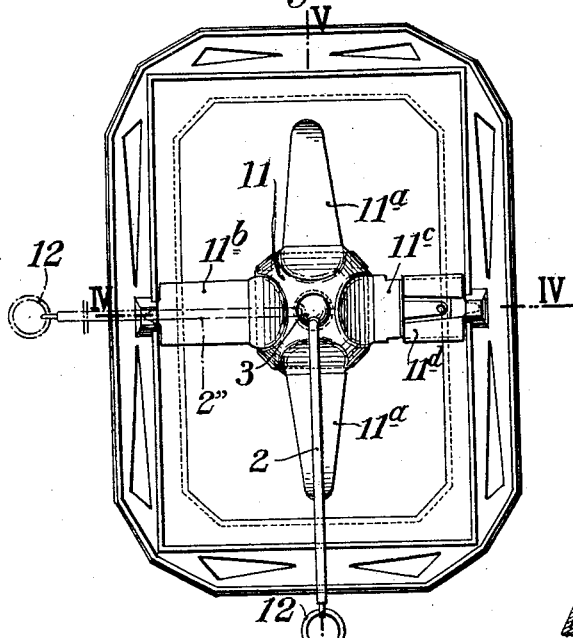
Figs. 3 to 5 illustrate a second form of construction.
Figure 5:
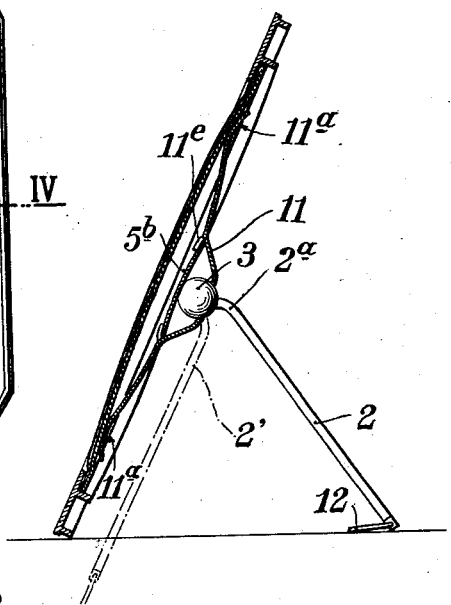
Figure 4:
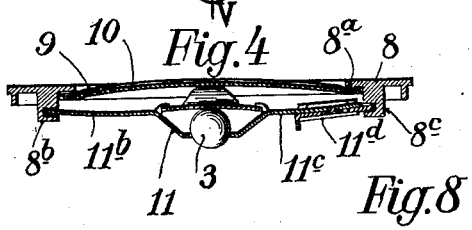

The form of construction illustrated in Figs. 3 to 5 is applied to a frame 8 carrying an engraving or a photograph clamped between a ledge 8a of this frame and a small rear plate 10.

The whole is held assembled by the pressure exerted on the rear face of the plate 10 by the ends of two suitably curved arms 11a of a spider, the two other arms 11b, 11c of which serve to secure it to the frame. For that purpose, the arm 11b terminates in a claw which can be inserted into a housing 8b provided in the edge of the frame, and the opposite arm 11c carries a locking bolt 11d which can be caused to slide for engaging its end in a second housing, 8c of the frame.

The various parts above mentioned being in position of assemblage (Fig. 4), it suffices for taking the whole to pieces, to cause the locking bolt 11d to slide towards the left of the drawing, for withdrawing it from the housing 8c, and then to release the arm 11b from the housing 8b.

This frame is supported by an easel-stand 2 terminated by a spherical member 3, as in the form of construction previously described.

The spherical member 3 is arranged within a cup 11 obtained by pressing the centre of the above spider. This cup is closed by a resilient metal blade 5b secured on its edges by means of hooks 11e obtained for instance by a cutting out operation.

These hooks are suitably arranged to bend the blade 5b on to the spherical member 3 and thus sufficiently tensioning it for pressing this spherical member against the bottom of the cup 11 (Fig. 5).

The easel-rod 2 terminates in a ring 12 which allows for instance of hanging it on a wall. In this case, for folding the easel-rod parallel to the frame, and for causing it to assume one of the positions 2', 2" shown in dot and dash lines in Figs. 3, 5, a suitable curvature 2a is given to this rod.

It is to be noted that the presence of the spherical member allows of hanging the frame on the wall as well vertically (position 2' of the easelstand) as horizontally (position 2"), or again in diagonal if a square frame is used, and thus procures the advantage that the frame can be placed in very different positions, according to the engraving it supports and the place it is to occupy.

The form of construction illustrated in Figs. 6, 7 is a modification of that shown in Figs. 1, 2; it is applicable for instance to a desk comprising a board 1a, the lower edge 1b of which is bent to serve as a support for the sheets this board carries.

This desk is supported by an easel-stand 2, also terminated in a spherical member 3, through the medium of which it is pivoted on the board 1a. The cup 13 in which the spherical member 3 is arranged is directly obtained by pressing the board, and, as in the form of construction illustrated in Fig. 5, the spring blade 5b which closes this cup and presses the spherical member 3 against it, is secured by means of claws 14 cut out in the board and suitably arranged.

The easel-rod 2 is straight and, in order to be able of folding it parallel to the board according to the position shown in dot and dash lines in Fig. 7, two slots 13a, allowing the passage of the end of said rod 2, are provided in the cup 13 according to the direction in which it is desired to effect this folding.

In the case of boards 1c of large dimensions, or having to support heavy articles (Fig. 8), use can be made of two stands 2 arranged as already described.

As shown in Figs. 9 to 11, the easel-stand 2 is also pivoted at the back of a frame 8 in which a photograph can be held by a plate 10.

This plate 10 is in its turn held in position by a spider, two branches 11b of which carry, one, a claw which can be inserted in a housing provided in a boss 8b carried by the edge of the frame 8, and the other, a locking bolt 11d which can be caused to slide so as to engage its end in a housing provided in a second boss 8c of the frame.

In assembled position, the two other branches 11a of the spider are suitably curved and press upon the rear face of the plate 10 and hold it against the edge of the frame.

Against the central portion of the spider is pressed a small circular plate 15 held in position by clamping between the spider and a washer 16, and by lugs 11f soldered on the spider, or cut out in the latter, and then bent over the said washer, so that the plate 15 can pivot on itself.

The washer 16 is suitably curved so that, when the lugs 11f are bent over the same, it can be slightly and resiliently distorted and can clamp the plate 15 against the spider 11a, 11b, whereby this resilient tension compensates the wear of the friction parts in proportion as it occurs and the plate 15 is, in any position, held stationary by friction.

The easel-stand 2 is rigid, at its upper end, with a transverse stud 17, the ends of which fit under flanges 18 secured to the plate 15 and serving as bearings for this stud.

The ends 18a of the flanges 18 extend in slots provided in the plate 15 and are curved so as to be held by clamping between this plate and the spider. The presence of these ends 18a has for effect to curve the plate 15, the edge of which is held pressed against the spider by the washer 16, and, consequently, to subject it to a certain tension which participates in the taking up of the play.

On the other hand, between the stud 17 and the plate 15 is inserted, upon assemblage, a metal blade 19 suitably curved for holding the stud 17 against the flanges 18; this curvature has for effect to take up the wear which can occur at this place and to hold the easel-stand stationary in any position by friction against the flanges, notwithstanding the weight of the frame.

The arrangement of the flanges 18 allows of completely folding the easel-stand against the frame, for instance in the position shown in dot and dash lines at 2′ in Fig. 11, without it being necessary to bend it. The frame can then be hung on the wall, by means of a ring 12 secured at the lower end of the easel-stand.

As the plate 15 is pivotally mounted, it also allows of setting the easel-stand in other positions, for instance to fold it against the frame and to bring it in the position illustrated in dot and dash lines at 2″ in Fig. 9, for hanging the frame, or again to set the easel-stand according to one of its diagonals, etc.

I claim:

1. Easel-support comprising the combination of a front supporting element, a rod having at its upper part a spherical member, a cross-shaped member having two resilient arms adapted to press against the back of the supporting element, and two arms adapted to be removably secured to the sides of the said supporting element, the central portion of the cross-shaped member being in the form of a cup for receiving the spherical member of the rod, and a resilient blade attached to the said cross-shaped member and adapted to press the said spherical member against the bottom of the said cup-shaped portion.

2. Easel-support comprising in combination of a front-supporting element, having in its side two opposite mortices, a rod having at its upper part a spherical member, a cross-shaped member having two resilient arms adapted to press against the back of the supporting element and two arms arranged for cooperating with the said mortices of the supporting element, a locking bolt sliding on one of these latter arms and adapted to enter the respective mortice, and the other arm having a tenon adapted to enter the other mortice, and the said rod provided with a spherical member being pivoted on the central portion of the said cross-shaped member.

3. In an easel-stand, the combination of a leg capable of being set, a spherical member at the upper part of this leg, a cup in the bottom of which is provided an orifice in which the said spherical member is arranged and can rotate in any direction, a spring blade in the said cup, the ends of which are secured to the inner walls of the said cup and the middle portion of which is arranged for bearing on the said spherical member and pressing it against the edges of the said orifice.

4. In an easel-stand, the combination of a leg capable of being set, a spherical member at the upper part of this leg, a cup in the bottom of which is provided an orifice in which the said spherical member is arranged and can rotate in any direction, a spring blade in the said cup, claws on the inner walls of the said cup and in which the ends of the said spring blade are gripped, this spring blade being arranged for bearing at its middle portion on the said spherical member and for pressing it against the edges of the said orifice.

5. In an easel-stand, the combination of a leg capable of being set, a spherical member at the upper part of this leg, a cup having in its bottom an orifice in which the said spherical member is arranged and can rotate in any direction, a spring blade in the said cup, the ends of which are secured to the inner walls of the said cup and the middle portion of which is arranged for bearing on the said spherical member and for pressing it against the edges of the said orifice, a frame adapted to be held by the said leg, a small plate fitted in the rear face of this frame, two resilient tongues arranged in alignment with each other on two opposite sides of the said cup and adapted to bear against the rear face of the said small plate, two arms arranged in alignment with each other on two other opposite sides of the said cup and at right angles relatively to the said resilient tongues, a prong at the end of one of the said arms, a locking bolt at the end of the other of the said arms, two recesses being provided in two opposite sides of the said frame and arranged, one for receiving the said prong and the other for receiving the said locking bolt.

6. In an easel-stand, the combination of a leg capable of being set, a spherical member at the upper part of this leg, a cup having in its bottom an orifice in which the said spherical member is arranged and can rotate in any direction, a spring blade in the said cup, the ends of which are secured to the inner walls of this cup and the middle portion of which is arranged for bearing on the said spherical member and for pressing it against the edges of the said orifice, and a ring at the free end of the said leg.

7. In an easel-stand, the combination of a leg capable of being set in any direction, a cup on which the said leg is pivoted, a frame adapted to be held by the said leg, a small plate fitted in the rear face of this frame, two resilient tongues arranged in alignment with each other on two opposite sides of the said cup and adapted to bear against the rear face of the said small plate, two arms arranged in alignment with each other on two other opposite sides of the said cup and at right angles relatively to the said resilient tongues, a prong at the end of one of the said arms, a locking bolt at the end of the other of said arms, two recesses being provided in two opposite sides of the said frame and arranged, one for receiving the said prong and the other for receiving the said locking bolt.

In testimony whereof I have hereunto affixed my signature.

HENRI SCHUTZ.